United States Patent [19]
Begin et al.

[11] Patent Number: 5,274,328
[45] Date of Patent: Dec. 28, 1993

[54] TEMPERATURE COMPENSATION FOR MAGNETOSTRICTIVE POSITION DETECTOR

[75] Inventors: John D. Begin; Richard D. Koski, both of Troy, Mich.

[73] Assignee: Magnetek Inc., Clawson, Mich.

[21] Appl. No.: 915,516

[22] Filed: Jul. 20, 1992

[51] Int. Cl.[5] ............ G01B 7/14; G01R 35/00; G01S 15/08

[52] U.S. Cl. .......... 324/207.12; 324/207.13; 324/207.24; 324/202; 364/571.07; 367/902

[58] Field of Search ........... 324/202, 207.12, 207.13, 324/207.22, 207.24; 73/290 V, 314; 364/571.01, 571.07; 367/127, 902

[56] References Cited
U.S. PATENT DOCUMENTS

| | | |
|---|---|---|
| 4,028,619 | 6/1977 | Edwards . |
| 4,071,818 | 1/1978 | Krisst . |
| 4,158,964 | 6/1979 | McCrea et al. . |
| 4,238,844 | 12/1980 | Ueda et al. . |
| 4,305,283 | 12/1981 | Redding . |
| 4,943,773 | 7/1990 | Koski et al. .......... 324/207.13 |
| 5,017,867 | 5/1991 | Dumais et al. . |
| 5,076,100 | 12/1991 | Hunter et al. . |

*Primary Examiner*—Gerard R. Strecker
*Attorney, Agent, or Firm*—Krass & Young

[57] ABSTRACT

In a position detection probe having a magnetostrictive wire stretched between a head and a reflective foot end termination, and a magnet displaceable along the probe and using the sonic pulse propagation time from the magnet to the foot as a position detection parameter, compensation for thermal expansion and thermal change of propagation velocity is made based on the property of the total propagation time along the wire length being a unique function of temperature and calibrating the probe at different temperatures to yield either equations or look up tables of true positions as functions of the total propagation time and the position detection parameter. By mapping wire characteristics at a plurality of magnet positions and temperatures to construct look up tables, wire nonlinearities as well as thermal effects can be compensated for.

8 Claims, 6 Drawing Sheets

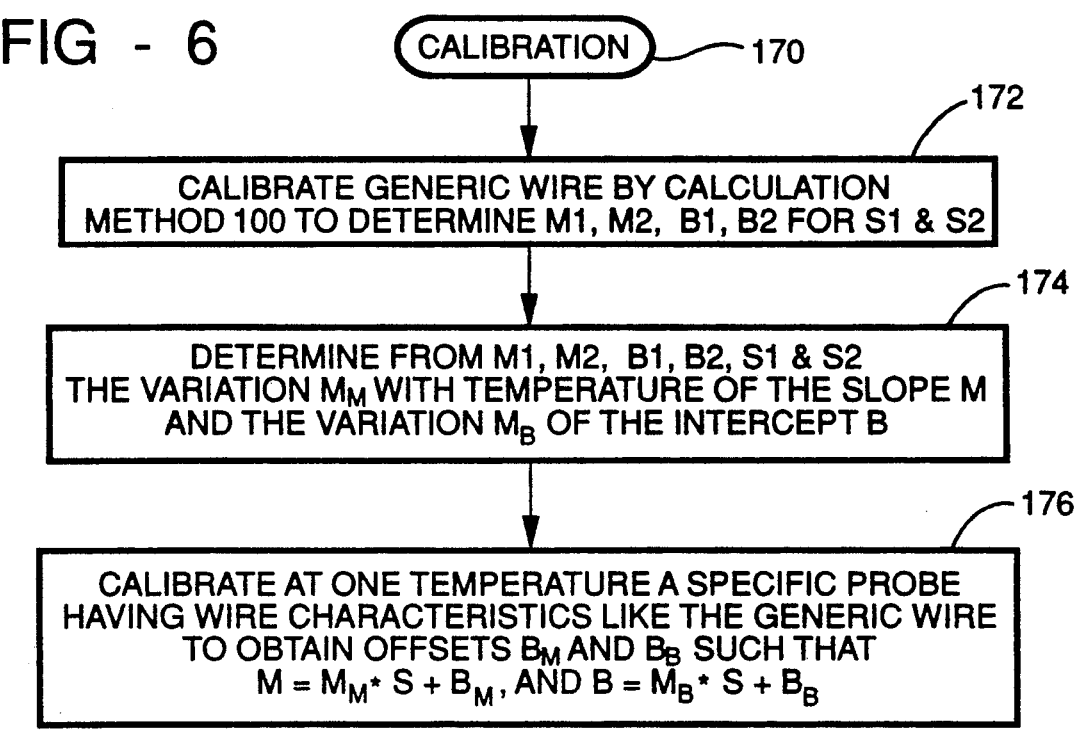
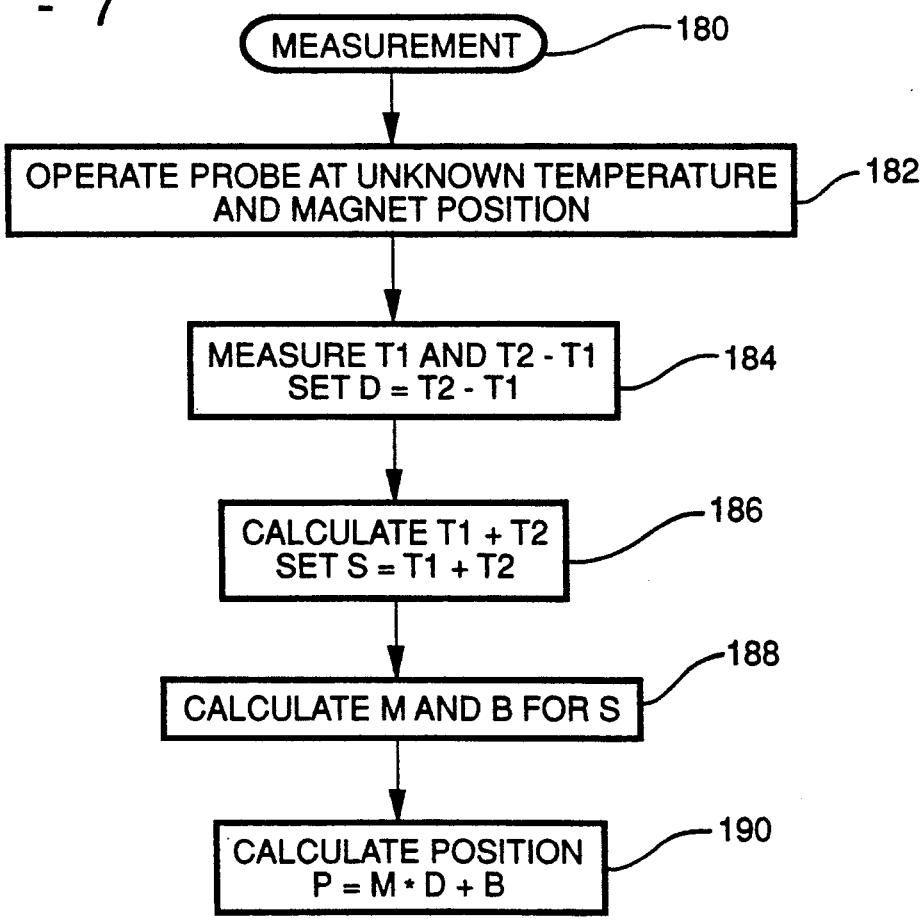

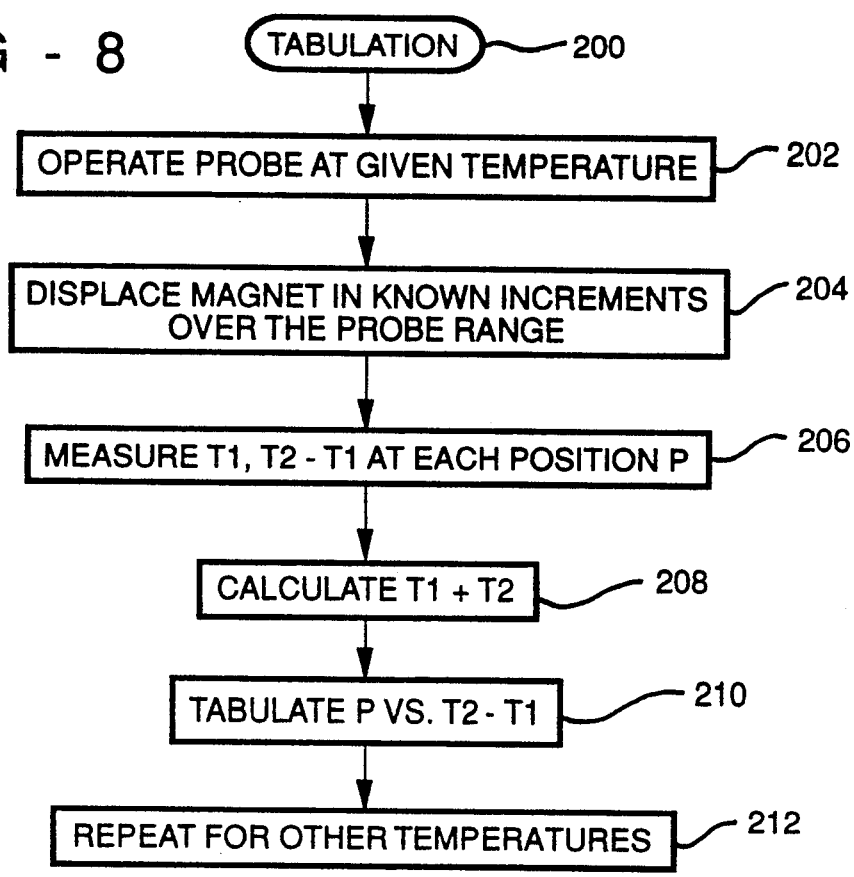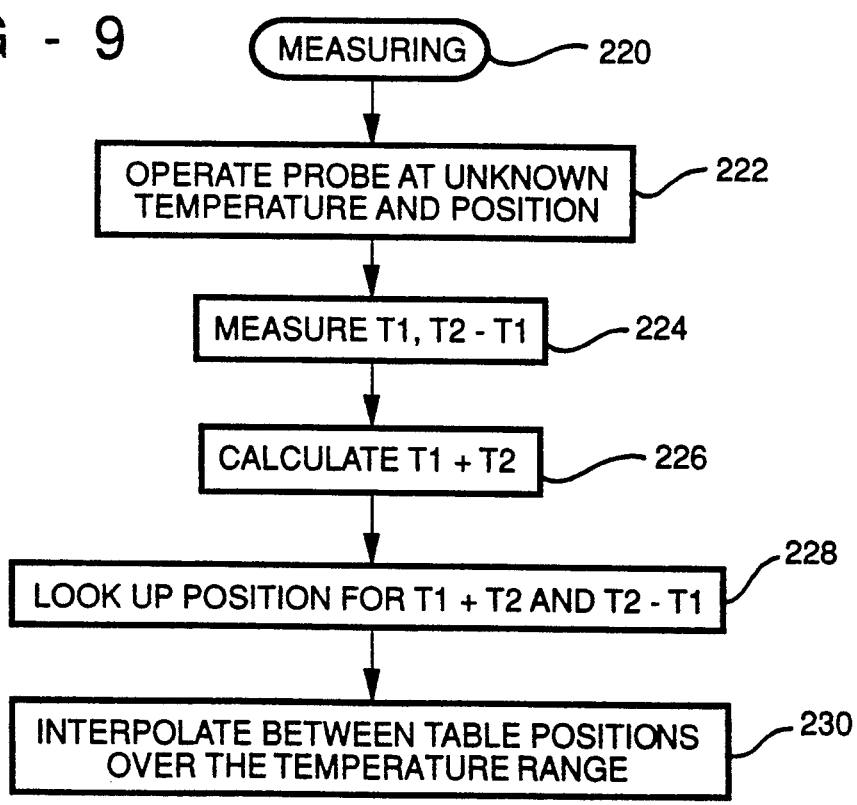

TEMPERATURE COMPENSATION FOR MAGNETOSTRICTIVE POSITION DETECTOR

FIELD OF THE INVENTION

This invention relates to a method of measuring position by a magnetostrictive position detector of the reflective type and particularly to such a method which compensates for all effects of temperature.

BACKGROUND OF THE INVENTION

The usefulness of the phenomenon of magnetostrictivity in linear distance or position measuring devices is well documented in the prior art. One improvement over the basic technology of particular interest is the increase in measurement resolution as set forth in the U.S. Pat. No. 5,017,867 to Dumais et al entitled "Magnetostrictive Linear Position Detector with Reflection Termination", which is incorporated herein by reference. According to that patent a magnetostrictive wire is stretched between a head and a reflective termination and a displaceable magnet is movably disposed along the wire in accordance with the position to be detected. The wire is excited by an electrical pulse which interacts with the field of the magnet to induce a torsional motion in the wire which propagates as sonic pulses in one direction directly to the head and in the opposite direction to the termination where is reflected to the head. A detector at the head senses the arrival times of the motions which are spaced in time according to the position of the magnet and the propagation velocity along the wire. The difference of the arrival times and the known length of the wire are used to calculate the position of the magnet. Alternatively, the wire is excited by a sonic pulse at the head and an electrical pulse is induced by the magnet when the mechancal pulse reaches the magnet directly and again upon reflection. The timing of the electrical pulses is used to calculate the magnet position in the same way as the electrical excitation type of detector.

The utilization of the entire wire length by the Dumais et al device leads not only to high resolution but also to a sensitivity to thermal changes in wire length. Thermal effects on magnetostrictive detectors have been considered by others as indicated by the United States patents Hunter et al U.S. Pat. No. 5,076,100, Redding U.S. Pat. No. 4,305,283, McCrea et al U.S. Pat. No. 4,158,964, Ueda et al U.S. Pat. No. 4,238,844, Krist U.S. Pat. No. 4,071,818 and Edwards U.S. Pat. No. 4,028,619. Thus it is recognized that the propagation rate of a mechanical pulse in the wire varies with temperature and also that thermal expansion of the wire or the tube supporting the wire can affect measurement accuracy. Various schemes for obviating some of the thermal effects are proposed, including the use of the total propagation times of a mechanical pulse traveling directly between the position magnet and the head and a pulse reflected from an end termination to compensate for changes in propagation velocity. Compensation for changes in wire length is discussed, for example by Krist, but no viable compensation method is advanced. Ueda et al teach measuring the sum of the propagation times along the wire but expressly assume the wire length is constant, using the sum information only for compensation of propagation rate. McCrea et al utilize a bottom reference magnet in a tank to obtain information on wire length. The reference magnet is presumed to have a fixed position but actually the magnet moves relative to the bottom as wire length changes and there is no teaching of compensating for the wire length change. Redding teaches compensating for propagation velocity changes by using two reference magnets at a fixed spacing and a movable magnet between the reference magnets to obtain time ratios independent of the propagation velocity. Hunter et al uses thermistors to provide temperature measurements which are used to adjust distance measurements. Edwards discloses a magnetostrictive rod anchored at one end to provide a reflective termination and has a sonic pulse detector at the other end. The arrangement precludes any effect of thermal expansion on the position measurement, but thermal effects on propagation velocity are detected for compensation purposes by comparing the count representing the sum of direct and reflected pulse propagation times to a constant value.

While effective compensation for thermal changes of propagation rate has been provided in the prior art there has been no effective compensation for thermal expansion of the wire. For the type of high resolution detector employed in this invention, the thermal expansion gives rise to larger errors than the change in propagation rate. For Nispan C magnetostrictive wire, the thermal expansion is 5 ppm/° C. while the propagation velocity change is only 3 ppm/° C. While both effects are significant and must be taken into account where precision measurements are required, the thermal expansion is especially important. Ideally, all thermal effects should be compensated for.

To the extent that the prior art compensates for thermal effects, it does so on the assumption that the magnetostrictive wire is linear; that is a given displacement of the magnet yields a proportionate change in the propagation interval. In reality, the magnetostrictive wires are not perfectly uniform and localized variations in the wire produce anomalies in the measured time intervals. Thus to achieve precise measurements the wire variations should be abrogated along with compensation for thermal effects.

SUMMARY OF THE INVENTION

It is therefore an object of the invention to provide a method of complete thermal compensation for magnetostrictive position detectors of the reflective type, and particularly to compensate for thermal changes in length. It is another object to provide in such a detector compensation for local irregularities in the wire as well as thermal compensation.

The invention is carried out by a linear magnetostrictive linear position detector having a magnetostrictive wire stretched between a fixed head and a reflection termination wherein the wire length and the position of the termination is dependent on temperature, a magnet movable along the wire, means for inducing sonic pulses in the wire traversing the direct distance between the head and the magnet over a first propagation time and the indirect distance between the head and the magnet via reflection at the foot end over a second propagation time, means for measuring the propagation times of the sonic pulses, and circuit means responsive to the measured propagation times of the pulses for determining the position of the magnet; by the method of measuring the magnet position and compensating for the effects of temperature changes comprising the steps of: determining the propagation characteristics of the wire as a function of the sum of propagation times, wherein the sum is representative of the wire temperature; measuring the sum of the propagation times; measuring the difference of propagation times at a given magnet position; and calculating the given position from the sum and the difference of propagation times.

BRIEF DESCRIPTION OF THE DRAWINGS

The above and other advantages of the invention will become more apparent from the following description taken in conjunction with the accompanying drawings wherein like references refer to like parts and wherein:

FIGS. 4 through 9 are flow charts illustrating the methods of carrying out the invention.

DESCRIPTION OF THE INVENTION

Figure 1:
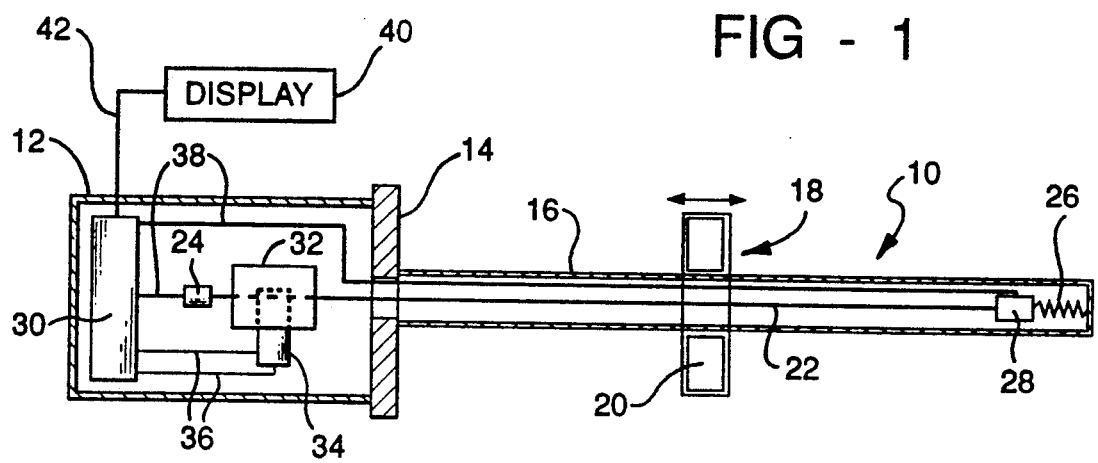
FIG. 1 is a cross-sectional view of a magnetostrictive probe used in carrying out the invention.

Referring to FIG. 1, a schematic diagram of a magnetostrictive linear position detector 10 shows a head 12 mounted on a base 14 and a tube 16 extending from the base, and a sliding collar 18 movably mounted on the tube 16 and containing a permanent magnet assembly 20, hereafter called a magnet 20. A magnetostrictive wire 22 preferably made of a nickel/iron alloy such as Nispan C is stretched along the center of the tube 16 and is held in the head at an anchor 24 which does not reflect sonic pulses in the wire. The wire 22 is held at its foot end in the end of the tube 16 by a spring 26 which applies a constant tension on the wire. A reflection collar 28 is secured to the wire 22 at the foot end and comprises a torus formed of a non-magnetic material such as brass and has a bore receiving the wire and a set screw to clamp the wire to the collar. The reflection collar 28 provides a mass discontinuity on the wire 22 which serves to reflect a sonic pulse arriving at the foot end of the wire back toward the head end.

The head 12 contains a signal processing circuit 30 and a transducer 32 which is well known in the art for sensing the arrival of a sonic pulse. The transducer 32 comprises a piezoelectric crystal 34 engaging the wire 22 and a pair of silicone rubber pads (not shown) engaging either side of the wire 22 and crystal 34. Electrodes on the crystal 34 are connected by leads 36 to the circuit 30. Torsional movement of the wire imparts a strain to the crystal 34 which produces a corresponding voltage pulse on the leads 36. Conversely, if a voltage is imposed on the crystal 34 by the leads 36 the crystal will impart a torsional pulse to the wire 22. The circuit 30 is connected by leads 38 to the head end and the foot end of the wire 22 to either impart an electrical pulse to the wire or to detect an electrical pulse in the wire. An external display 40 for showing measurement results is connected to the circuit 30 by a line 42.

Figure 2:
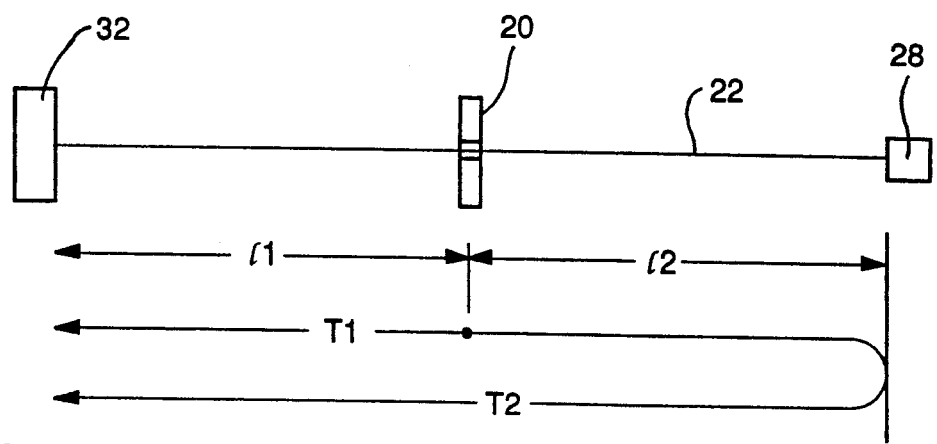
FIG. 2 is a diagram illustrating propagation times of sonic pulses in the probe of FIG. 1.

In general the probe 10 operates in either of two modes. In the first mode the probe is excited by applying an electrical pulse from the circuit 30 to the wire 22 and the field of the magnet 20 interacting with the electrical pulse causes a torsional motion in the wire. That torsional motion, herein called a sonic pulse, propagates in both directions along the wire at a temperature dependent velocity so that the one pulse reaches the transducer directly and a second pulse is first reflected from the collar 28 and then reaches the transducer, so that the transducer 32 produces two electrical pulses separated by a time interval. As illustrated in the schematic drawing of FIG. 2, the first pulse arrives at the head a time interval T1 after it is initiated, the time interval being proportional to the distance $l_1$ between the magnet 20 and the transducer 32. The second pulse arrives at the head a time interval T2 after initiation which is proportional to the distance $2l_2+l_1$, where $l_2$ is the distance between the magnet 20 and the reflective collar 28. The times T1 and T2 are processed by the circuit 30 to determine the position of the magnet. In the second mode of operation the probe is excited by energizing the transducer to apply a torsional motion to the head end of the wire 22 and the resultant sonic pulse travels to the magnet 20 first in a direct path and second after reflection from the collar 28. Each time the sonic pulse reaches the magnet an electrical pulse is induced in the wire 22 due to interaction with the magnetic field of the magnet. This results in two pulses reaching the circuit 30 via the leads 38 at time intervals T1 and T2 which are the same as those described above. Additional details on the construction and operation of such a transducer and the probe as a whole are given in the aforesaid U.S. Pat. No. 5,017,867 to Dumais et al. The circuit 30, however is different from that described in the patent.

Figure 1A:
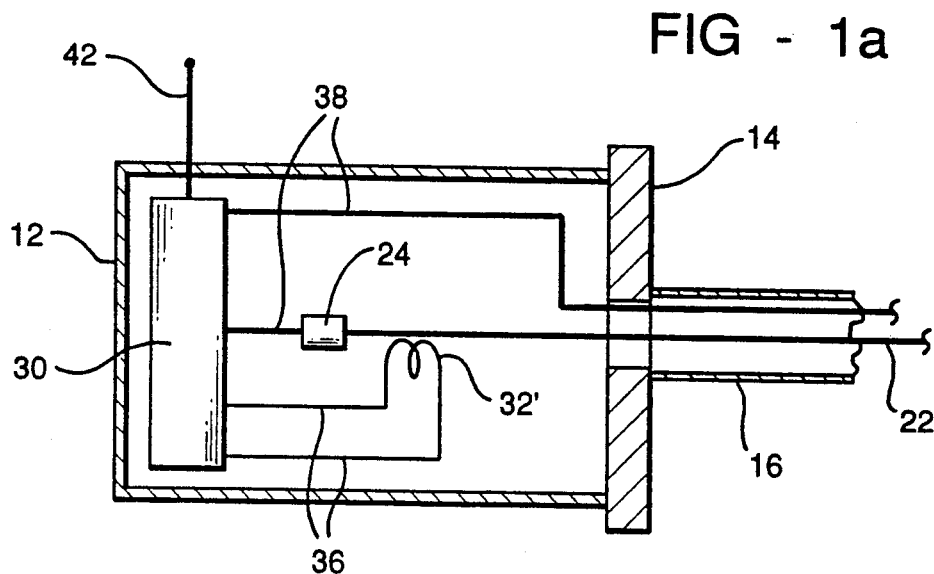
FIG. 1a is a partial view of a probe showing an alternative structure to the FIG. 1 probe.

FIG. 1a depicts an alternative probe which is the same as the probe of FIG. 1 except that a transducer coil 32' is used in place of the transducer 32. The coil 32' is sensitive to a magnetic pulse which accompanies the sonic pulse to produce an electrical pulse on lines 36 when a sonic pulse reaches the transducer location in the head. Thus the function of detecting a sonic pulse is equivalent to that of the transducer 32. However, the transducer coil 32' operates only in the first mode as described above.

Figure 3:
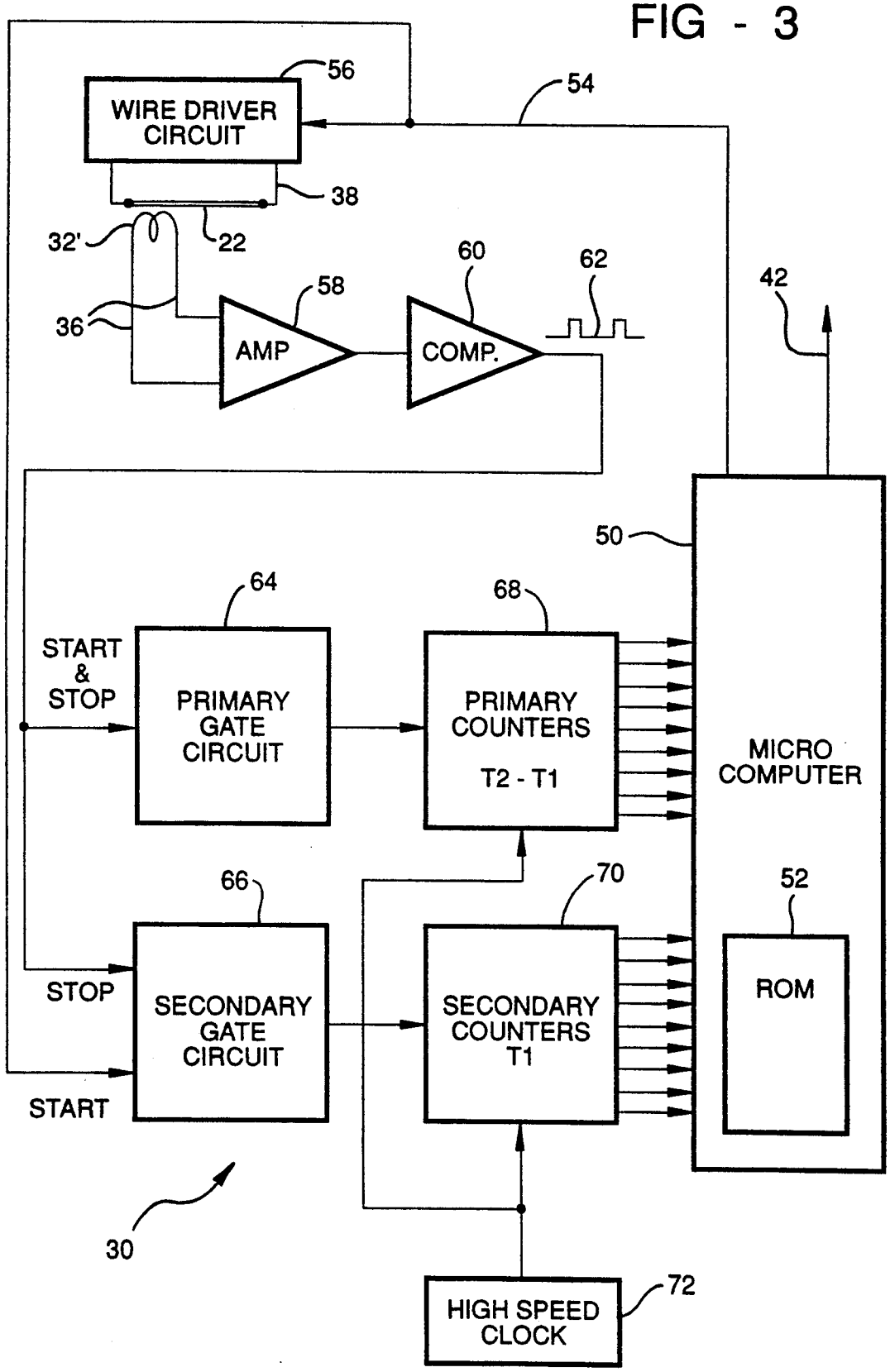
FIG. 3 is a schematic circuit diagram of the circuit of the probe of FIG. 1.

The circuit 30, as shown in FIG. 3, is configured to register time intervals T1 and T2−T1. The circuit 30 is based on a microcomputer 50 including a ROM 52 and which has an output to the display 40 on line 42 and an output line 54 to a driver circuit 56. The driver circuit is coupled via lines 38 to the wire 22 to supply periodic electrical excitation pulses to the wire when commanded by the computer 50. The transducer coil 32' (or transducer 32) which senses sonic pulses in the wire is coupled by the leads 36 to an amplifier 58 which feeds a comparator 60. The comparator issues return pulses 62 when the sonic pulses arrive at the head and produce signals which, when amplified, exceed a threshold set in the comparator. The comparator 60 output is coupled to the inputs of a primary gate circuit 64 and a secondary gate circuit 66. The computer output line 54 is also connected to an input of the secondary gate circuit 66. Primary and secondary counters 68 and 70, respectively, are coupled to a high speed clock 72 and are controlled by the respective gate circuits 64 and 66. The counters have digital outputs fed to the computer 50.

In operation, the computer 50 issues a series of trigger pulses to the driver 56, the pulses being spaced sufficiently to allow cessation of the sonic pulses in the wire resulting from an excitation pulse before applying the next excitation pulse. The two pulses 62 corresponding to the time T1 when the direct pulse reaches the head and the time T2 when the reflected pulse reaches the head cause the primary gate circuit to start and stop respectively so that the counter 68 counts the clock pulses during the period between the receipt of the T1 pulse and the T2 pulse, so that the final counter content will be proportional to the difference T2−T1. The secondary gate circuit 66 is started by each trigger pulse on line 54 and stopped by the T1 pulse, so that the counter content will be proportional to T1.

The sum S=T1+T2 of the propagation times is the time for the sonic pulse to propagate a distance of twice the length of the wire 22 or 2($l_1$+$l_2$). For a given probe at a constant temperature the sum S is a constant for any position of the magnet. Temperature changes, however, affect both the propagation velocity of the sonic pulse and the length of the wire 22. The sum S has a unique, repeatable value at each temperature and thus is used as the temperature parameter; independent temperature measurement is not necessary. By calibrating the wire to determine parameters defining its thermal characteristics, temperature compensation can be accomplished and all thermal effects including changes in propagation velocity and wire length will be comprehended. Results of calibration are stored in the ROM 52 of the computer 50 and subsequent position calculations are made by the computer using the calibration data.

Figure 4:
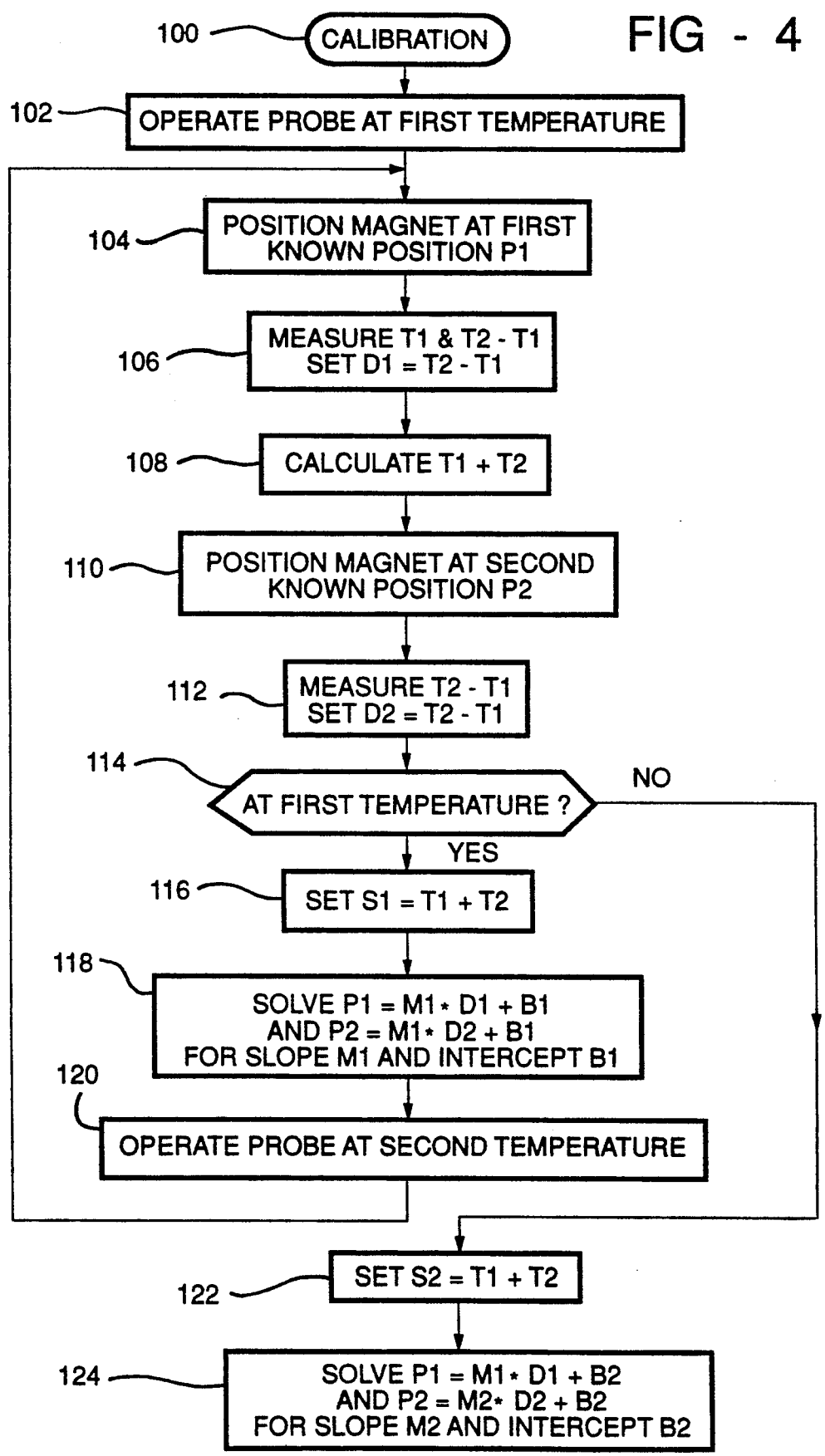

The first calibration scheme assumes that the system is linear; that is, the thermal effects on position measurement are proportional to temperature changes and the propagation rate in the wire is uniform so that changes in the measured time intervals are proportional to magnet displacement. Such a system can be defined by a linear equation P=M*D+B where P is the magnet position relative to some fixed reference such as the head end of the wire, M is a temperature dependent slope to be determined by calibration, D is the propagation time difference T2−T1, and B is a temperature dependent intercept also determined by calibration. The calibration is carried out at a first temperature (say, about 25° C.) by positioning the magnet accurately at two different known positions and making measurements of the time interval T1 and the time difference D=T2−T1, repeating the measurement at another temperature (say, about 80°), and solving the linear equation for each temperature. The temperature is always identified by the parameter S=T1+T2. The flow chart of FIG. 4 details the calibration procedure. In this and other flow charts references to tasks which have been detailed in flow diagram function blocks are designated by <nn>, where nn is the block reference number. The calibration process 100 includes operating the probe at a first temperature<102>, positioning the magnet at a first known position P1<104>, energizing the probe to measure T1 and T2−T1 and set D1=T2−T1<106>, calculate the sum T1+T2 from the measured values of T1 and T2−T1<108>, position the magnet 22 at a second known position P2<110>, measure T2−T1 and set D2 equal to T2−T1<112>; since the probe is at the first temperature<114> S1 is set equal to T1+T2 <116> and the linear equations are solved for the slope M1 and the intercept B1<118>. Next, the probe is operated at a second temperature<120> and the steps 104-112 are repeated; since the probe is at the second temperature <114>, S2 is set equal to T1+T2<122> and finally the linear equations are solved for the slope M2 and the intercept B2. Thus for each of the two temperatures S1 and S2 both the slope and intercept are determined.

Figure 5:
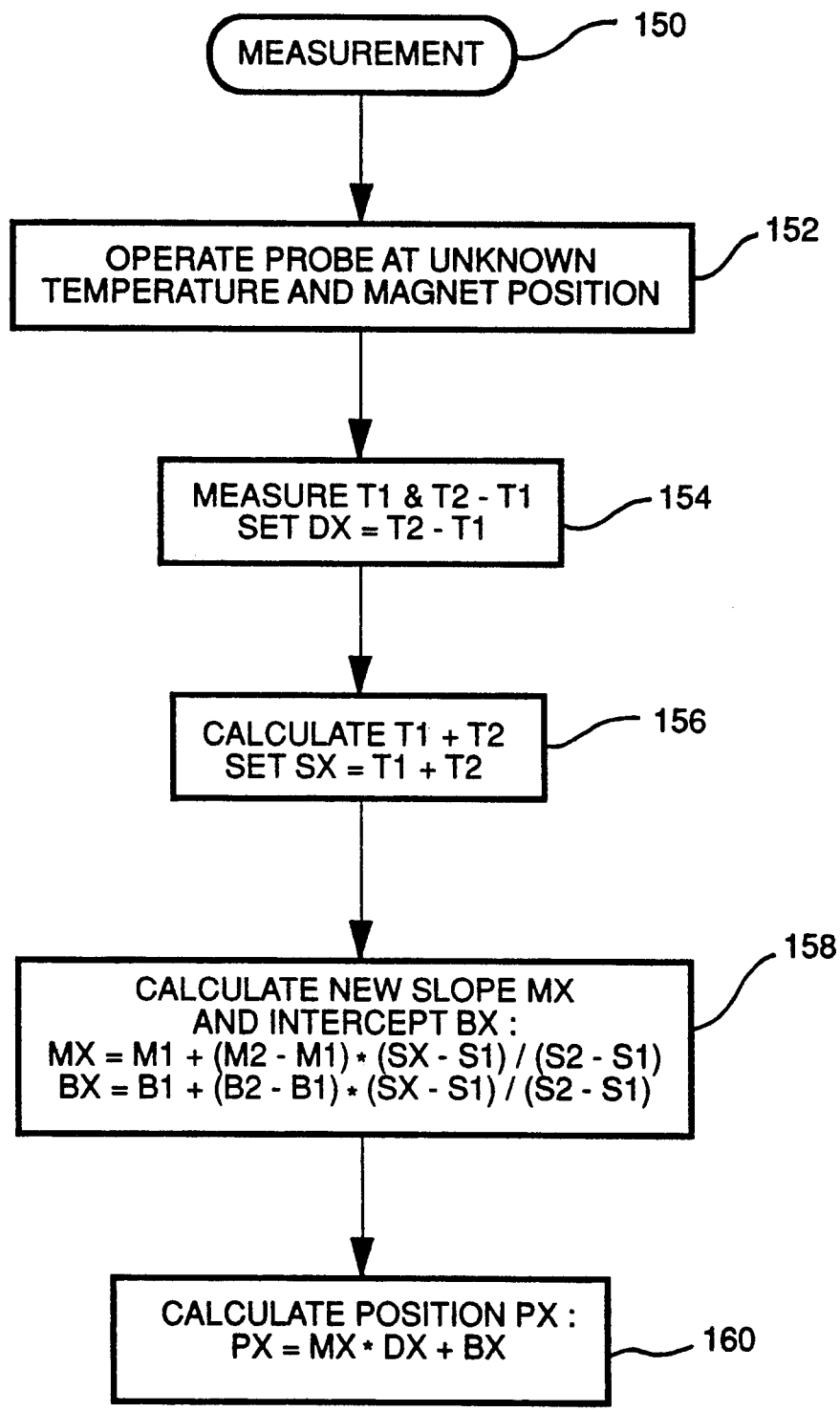

Once the probe has been calibrated it can be used to measure the magnet position at an unknown temperature. New slope and intercept values for the new temperature must be determined by interpolation. As shown in the flow chart of FIG. 5 the measurement method 150 comprises operating the probe at some magnet position<152>, measuring T1 and T2−T1 and setting the difference Dx equal to T2−T1<154>, calculating T1+T2 and setting the sum Sx equal to T1+T2 <156>, calculating the new slope Mx and intercept Bx for the present temperature, Sx, from the interpolating equations $$Mx=M1+(M2-M1)*(Sx-S1)/(S2-S1) \text{ and}$$

$$Bx=B1+(B2-B1)*(Sx-S1)/(S2-S1)<158>,$$

and finally calculating the magnet position from Px=Mx*Dx+Bx<160>.

Another calibration method for linear probes which is less expensive for building a large number of probes using wires having the same thermal characteristics defines the general equations for the wire slope M and intercept B such that M=$M_M$*S+$B_M$ and B=$M_B$*s+$B_B$. This method entails determining the temperature dependent wire characteristics $M_M$ and $M_B$ by empirical methods applied to data from one calibrated wire or to a history of data accumulated from a number of similar wires, and then finally calibrating each individual probe at only one temperature to establish offsets $B_M$ and $B_B$ which are peculiar to a specific probe. The resulting equations allow easy calculation of subsequent position measurements. The flow chart of FIG. 6 shows the calibration method 170 which first determines for two temperatures S1 and S2 the wire characteristic parameters M1, M2, B1 and B2 by the calibration method 100, for example<172>. Then the variation $M_M$ with temperature of the slope M and the variation $M_B$ of the intercept B are calculated from the wire characteristic parameters<174>, and then each individual probe is calibrated at one temperature to obtain the offsets $B_M$ and $B_B$<176>.

Given the equations for M and B provided by the calibration method 170, measurements by a probe are easily made. As set out by the flow chart of FIG. 7, the measurement method 180 comprises operating the probe at some magnet position<182>, measuring T1 and T2−T1 and setting D equal to T2−T1<184>, calculating T1+T2 and setting it equal to S<186>, calculating M and B for the present value of S from the equations determined during the calibration<188>, and finally calculating magnet position as P=M*D+B<190>.

Due to the difficulty of manufacturing magnetostrictive wire which is perfectly uniform along its length there will be some local variations affecting propagation velocity so that equal incremental displacements of the magnet along the wire do not necessarily result in equal changes in the measured time intervals. There may also be nonuniform changes with temperature along the wire. To compensate for those nonlinearities the wire is calibrated by mapping the time difference T2−T1 versus the magnet position over the magnet displacement operating range of the probe for many temperatures represented by T1+T2 over the thermal operating range of the probe. The data is stored in look-up tables, preferably in the ROM 52 of the computer, and during probe measurement the position data is located in the tables using T2−T1 and T1+T2 as addresses. The mapping process or tabulation 200 is illustrated by the flow chart of FIG. 8 and entails operating the probe at a given temperature<202>, displacing the magnet in precise increments over the probe range <204>, measuring the values T1 and T2−T1 at each magnet position <206>, calculating the temperature parameter T1+T2 <208>, tabulating the positions versus the time difference T2−T1 <210>, and repeating for other temperatures <212> to afford a plurality of tables, one for each temperature. For precision results the position increments may be quite small, say 0.001 inch so that a large amount of data is stored in the tables.

The use of the tables during measurement is illustrated in FIG. 9. The measurement process 220 comprises operating the probe at a particular position <222>, measuring T1 and T2−T1 <224>, calculating T1+T2 <226> and looking up the position in the tables according to the temperature T1+T2 and the time difference T2−T1 <228>. In the event the measured values fall between table addresses, the nearest neighbors in the table are located and the position determined by interpolation <230>.

Rather than using look-up tables, equations representing the data accumulated during calibration can be generated by curve-fitting techniques and each position measured by the probe is calculated from the equations and the measured time intervals.

It is thus seen that the methods of the invention allow a magnetostrictive position detector to operate with high resolution and high resolution, taking into account all thermal effects which could detract from measurement accuracy.

The embodiments of the invention in which an exclusive property or privilege is claimed are defined as follows:

1. In a linear magnetostrictive position detector having a magnetostrictive wire stretched between a fixed head and a reflection termination wherein propagation characteristics of the wire including propagation velocity and the wire length, and the position of the termination are dependent on temperature, a magnet movable along the wire, means for inducing sonic pulses in the wire traversing the direct distance between the head and the magnet over a first propagation time and the indirect distance between the head and the magnet via reflection at the termination over a second propagation time, means for measuring the propagation times of the sonic pulses, and circuit means responsive to the measured propagation times of the pulses for determining the position of the magnet; the method of measuring the magnet position and compensating for the effects of temperature changes on propagation characteristics comprising the steps of:
   determining the propagation characteristics of the wire as a function of the sum of first and second propagation times, wherein the sum is representative of the wire length and propagation velocity;
   measuring the sum of the first and second propagation times;
   measuring the difference of first and second propagation times at a given magnet position; and
   calculating the given position from the difference of propagation times and from the propagation characteristics represented by the sum of the propagation times.

2. The invention as defined in claim 1 wherein the difference of propagation times is a slightly nonlinear function of the magnet position, and wherein:
   the step of determining the propagation characteristics comprises mapping a plurality of magnet positions along the wire as a function of the sum of propagation times and of the difference of propagation times.

3. The invention as defined in claim 2 wherein the step of determining the propagation characteristics further includes compiling a two dimensional look-up table of magnet position as a function of independent variables comprising the sum of propagation times and the difference of propagation times; and
   the step of calculating the given position comprises looking up the position in the table according to the propagation times.

4. The invention as defined in claim 2 wherein the step of determining the propagation characteristics further includes compiling a two dimensional look-up table of magnet position as a function of independent variables comprising the sum of propagation times and the difference of propagation times; and
   where a measured propagation time is between tabulated values, the step of calculating the given position comprises looking up positions in the table neighboring the measured time and interpolating between the positions.

5. In a magnetostrictive position detector having a magnetostrictive wire stretched between a fixed head and a reflection termination wherein the wire length and the position of the termination is dependent on temperature, a magnet movable along the wire, means for inducing sonic pulses in the wire traversing the direct distance between the head and the magnet over a first propagation time and the indirect distance between the head and the magnet via reflection at the termination over a second propagation time, means for measuring the propagation times of the sonic pulses, and circuit means responsive to the measured propagation times of the pulses for determining the position of the magnet; the method of measuring magnet position and compensating for the effects of temperature changes comprising the steps of:
   calibrating the wire temperature dependent propagation characteristic by measuring the sum S of the propagation times at a first temperature and measuring the difference D of propagation times at the first temperature for two known magnet positions P;
   calculating the slope M and intercept B for the equation $P = M*D + B$ from measurements at the known magnet positions P to obtain values S1, M1 and B1 for the first temperature;
   repeating the calibrating and calculating steps at a second temperature to obtain values S2, M2 and B2 for the second temperature;
   measuring a position Px at an unknown temperature by measuring the sum Sx of the propagation times and the difference Dx of the propagation times, calculating new slope and intercept values Mx and Bx as a function of the sums S1, S2 and Sx, and calculating the position as $Px = Mx*Dx + Bx$.

6. The invention as defined in claim 5 wherein the step of calculating new slope and intercept values comprises calculating $$Mx = M1 + (M2 - M1)*(Sx - S1)/(S2 - S1) \text{ and}$$

$$Bx = B1 + (B2 - B1)*(Sx - S1)/(S2 - S1).$$

7. In a linear position detector having a magnetostrictive probe wire stretched between a fixed head and a reflection termination wherein the wire length and the position of the termination is dependent on temperature, a magnet movable along the wire, means for inducing sonic pulses in the wire traversing the direct distance between the head and the magnet over a first propagation time and the indirect distance between the head and the magnet via reflection at the termination over a second propagation time, means for measuring the propagation times of the sonic pulses, and circuit means responsive to the measured propagation times of the pulses for determining the position of the magnet, the method of measuring the magnet position and compensating for the effects of temperature changes comprising the steps of:

exciting the probe wire by an electrical pulse and measuring the sum Sx and the difference Dx of propagation times of wire motion from the magnet directly to the head and reflected from the termination, respectively; and calculating a position Px at an unknown temperature by the equation $Px = M*Dx + B$;

wherein the values of the slope M and the intercept B of the equation are temperature dependent and vary with the sum S of propagation times and are determined by the step of calibrating a wire of characteristics similar to the probe wire at two different temperatures and at two known positions at each temperature to determine values of M and B as a function of the sum S of propagation times, and calculating the specific values of M and B for the sum Sx at the said unknown temperature.

8. The invention as defined in claim 7 wherein the values of M and B are linear function of the sum S of propagation times and wherein the step of calibrating a wire of similar characteristics comprises;

determining $M = M_M*S + B_M$ and $B = M_B*S + B_B$ wherein the values $M_M$ and $M_B$ represent the respective rates of change of M and B as functions of the sum S and are determined by the step of calibrating a wire with characteristics similar to the probe wire at two different temperatures and at two known positions at each temperature; and determining the intercept values $B_M$ and $B_B$ by calibrating the probe wire at one temperature.

* * * * *